United States Patent [19]

Kobayashi et al.

[11] Patent Number: 4,725,853
[45] Date of Patent: Feb. 16, 1988

[54] PRINTER HAVING A THERMAL HEAD

[75] Inventors: Ryooichi Kobayashi, Hitachi; Katsumasa Mikami, Naka; Masafumi Suzaki, Hitachi; Yousuke Nagano, Hitachi; Akira Sasaki, Hitachi; Fumio Takahagi, Hitachi, all of Japan

[73] Assignee: Hitachi, Ltd., Tokyo, Japan

[21] Appl. No.: 837,678

[22] Filed: Mar. 10, 1986

[30] Foreign Application Priority Data

Mar. 15, 1985 [JP] Japan ................................. 60-50479
Mar. 27, 1985 [JP] Japan ................................. 60-60792

[51] Int. Cl.$^4$ ............................................. G01D 15/10
[52] U.S. Cl. .............................. 346/76 PH; 346/76 R; 400/662
[58] Field of Search ............ 346/76 PH, 76 R, 134 R; 400/18, 120, 388, 662; 219/216 PH, 243, 245, 254–255, 257, 543

[56] References Cited

U.S. PATENT DOCUMENTS

4,489,485 12/1984 Tatsumi et al. .................... 219/543

Primary Examiner—Arthur G. Evans
Attorney, Agent, or Firm—Antonelli, Terry & Wands

[57] ABSTRACT

A thermal head is pressed against a platen consisting of rubber through a recording paper or a heat sensitive paper. The thermal head is provided a head base, a glaze layer portion mounted on the head base, and a heating resistor portion provided on the glaze layer portion. An unit area surface pressure applied from the glaze layer portion of the thermal head to the recording paper or the heat sensitive paper is set to not less than 0.3 kg/mm$^2$. A hardness of the rubber of the platen is adapted to about Hs 40°–Hs 100°. The high areas of the surface of the recording paper or the heat sensitive paper are flattened to increase the smoothness of the surface of the recording paper or the heat sensitive paper. A high quality printed product of the thermal transfer printer or the thermal printer can be obtained even when the relatively rough recording paper or the heat sensitive paper is used as the object paper.

9 Claims, 30 Drawing Figures

PRINTER HAVING A THERMAL HEAD

BACKGROUND OF THE INVENTION

1. Field of the Invention

The present invention relates to a printer having a thermal head, and more particularly to a thermal transfer printer or a thermal printer with the improvement of a quality of a printed product obtained thereby.

2. Description of the Prior Art

In a thermal transfer printer, wherein a recording paper and a transfer film of an ink ribbon are laminated between a platen and a thermal head, the transfer film is heated as it is pressed against the recording paper by the thermal head, to melt or sublime a coloring agent on the transfer film and thereby transfer the resultant coloring agent to the recording paper. The thermal transfer printer is advantageous in that the thermal transfer printer does not require a spcial paper as the object recording paper.

However, such a thermal transfer printer is faulty in that the quality of a printed product obtained thereby varies depending upon the smoothness of the surface of the recording paper in use. Namely, when the recording paper is relatively rough, the coloring agent melted or sublimed by the thermal head is deposited on the high areas of the rough surface of the relatively rough recording paper and not spread into the low areas thereof. Consequently, the voids and the transfer failures occur on the printed dots or the transferred dots to cause the quality of the printed product to decrease.

Figure 26:
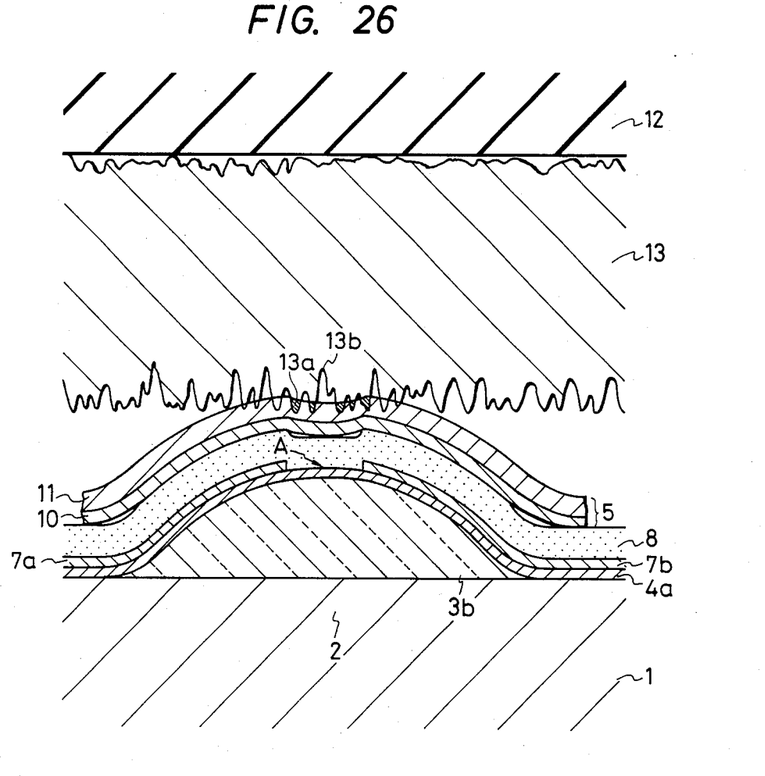
FIG. 26 is an enlarged section view of the thermal head and the relatively rough recording paper in contact with each other.

FIG. 26 is an enlarged sectional view illustrating the contacting showing a thermal transfer recording operation and ondition of a thermal head 1, an ink ribbon 5 and a relatively rough recording paper 13 used as object recording paper. A heating resistor portion 4a of the thermal head 1, which is fomred on a partial glaze layer portion 3a consisting of glass, generates the heat at its portion when the electric current is applied thereto through an electrode 7a. This heat is transmitted to the ink ribbon 5 through a protective layer 8. As a result, he solid ink applied to a base film 10 of the ink ribbon 5 is melted, so that the transfer of an image starts.

When relatively rough recording paper 13 as an object recording paper is used, the difference between the top of a peak 13a of the relatively rough recording paper 13 and the bottom of a valley 13b of the relatively rough recording paper 13 is as great as about 10–28 μm as shown in FIG. 26. Therefore, even if the ink layer 11 is melted with the ink ribbon 5 simply applied to such a surface of the relatively rough recording paper 13, the molten ink cannot enter the interior of the valley 13b of the relativley rough recording paper 12. so that the ink recording paper 13 which has the valley 13b. Accordingly, neither the motlen ink nor the sublimed ink are left in the low areas 13b of the relatively rough recording paper 13, they are necessarily left around the high areas 13a of the relatively rough recording paper 13 alone.

Figure 27:
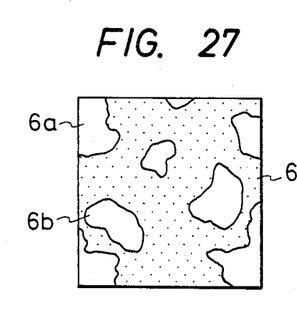
FIG. 27 illustrates the example view of the printed dot of which the relatively rough recording paper is used.
Figure 28:
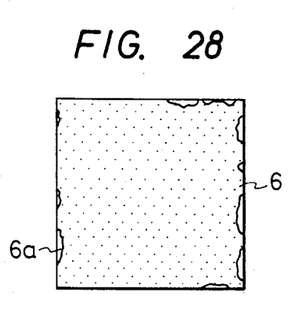
FIG. 28 illustrates the example view of the printed dot of which the normally smooth recording paper is used.

FIGS. 27 and 28 show printed dot 6 per one picture element. FIG. 27 shows an example of the printed image on the relatively rough recording paper 13, and FIG. 28 an example of the printed image on the smooth recording paper. It will be understood that the printed dots 6 on the relatively rough recording paper 13, which has the low transfer rate ($T_r$), includes the large voids 6a and the large transfer failures 6b, and are not practical.

As stated above when the relatively rough recording paper 13 is used as the object recording paper in the conventional thermal transfer printer, the quality of the printed product markedly decreases. Namely, when the relatively rough recording paper 13 is used, the ink melted by the thermal head 1 is transferred only to the high areas 13a or the portion of surrounding around the top of the peak 13a on the surface of the relatively rough recording paper 13.

The conventional thermal transfer printer provides with a round platen, an ink ribbon cassette and a thermal head mounted on a carriage, and an ink ribbon is housed in the ink ribbon cassette. The thermal head of the conventional thermal transfer printer for use in improving the thermal transfer efficiency is disclosed in, for example, Japanese Patent Laid-open Publication No. 78868/1984 and Japanese Utility Model Laid-open Publication No. 41540/1984.

The thermal head consists of a head base, partial glaze layer portions or projections provided on the head base, and heating resistor portions provided on the tops of the partial glaze layer portions. However, the above thermal transfer printer using any of these thermal head is applied to the relatively rough recording paper, a printed product of a sufficiently high quality cannot be obtained, i.e., the above-mentioned faults cannot be eliminated.

Figure 29:
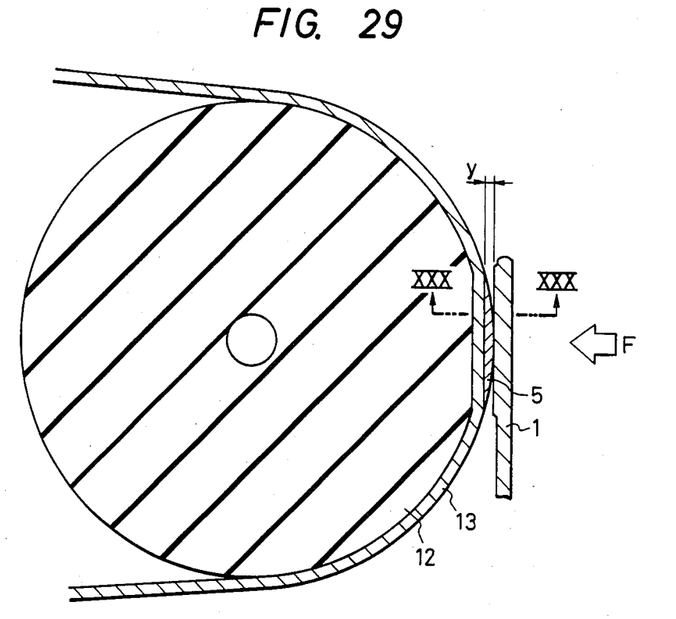
FIG. 29 is a schematic diagram showing the contacting condition of the thermal transfer printer.
Figure 30:
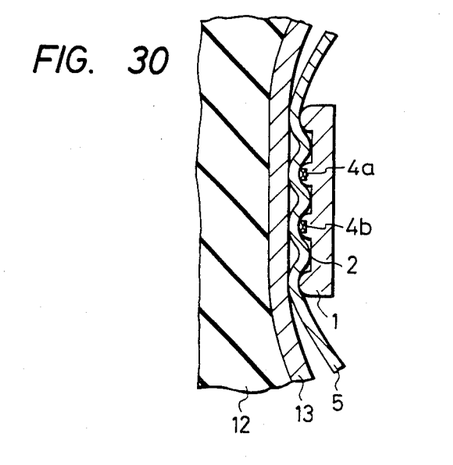
FIG. 30 is a sectional view taken along a line XXX—XXX in FIG. 29.

The condition of the head contact in the conventional thermal transfer printer, will be described with reference to FIGS. 29 and 30. FIGS. 29 and 30 show a principal portion surrounding around the conventional thermal transfer printer, which is provided with a round platen 12 having a hardness ($H_s$) of rubber of not more than $H_s 20°$.

When a thermal head 1 in FIG. 29 is pressed with a force (F), the pressing force (F) is transmitted to the round platen 12 through the ink ribbon 5 and the relatively rough recording paper 13. If the hardness ($H_s$) of the rubber of the round platen 12 is as low as $H_s 20°$, the round platen 12 is indentated by (y) by the pressing force (F). Consequently, this pressing force (F) is also diffused to the head base 2 of the thermal head 1 to greatly decrease the unit area surface pressure (P), so that it becomes difficult to depress the high areas 13a or the peaks 13a of the surface of the relatively rough recording paper 13. Therefore, the printing on the relatively rough recording paper 13 is impossible.

Increasing the hardness ($H_s$) of rubber of the round platen 12 may then be considered. If, however, the hardness ($H_s$) of rubber of the round platen 12 is increased excessively, a flat surface portion of the round platen 12 cannot be obtained, so that the printing is still impossible.

In the conventional thermal transfer printer, the hardness ($H_s$) of the round platen 12 is adapted not more than $H_s 20°$ as stated above. When the hardness ($H_s$) of the round platen 12 is is not more than $H_s 20°$, the round platen 12 is greatly deformed by the pressing force (F) from the thermal head 1, and those portions of the thermal head 1 which are other than the partial glaze layer portions 4a and 4b of the thermal head 1 contact the round platen 12, as shown in FIG. 30, so that the unit area surface pressure (P) of the thermal head 1 decreases greatly. Consequently, the ink ribbon 5 does not closely contact with the relatively rough recording paper 13, and the voids and the transfer failures occur in the transferred dots or in the printed dots. This causes a decrease in the density of the printed image, so that the image is only partially reproduced.

Figure 1:
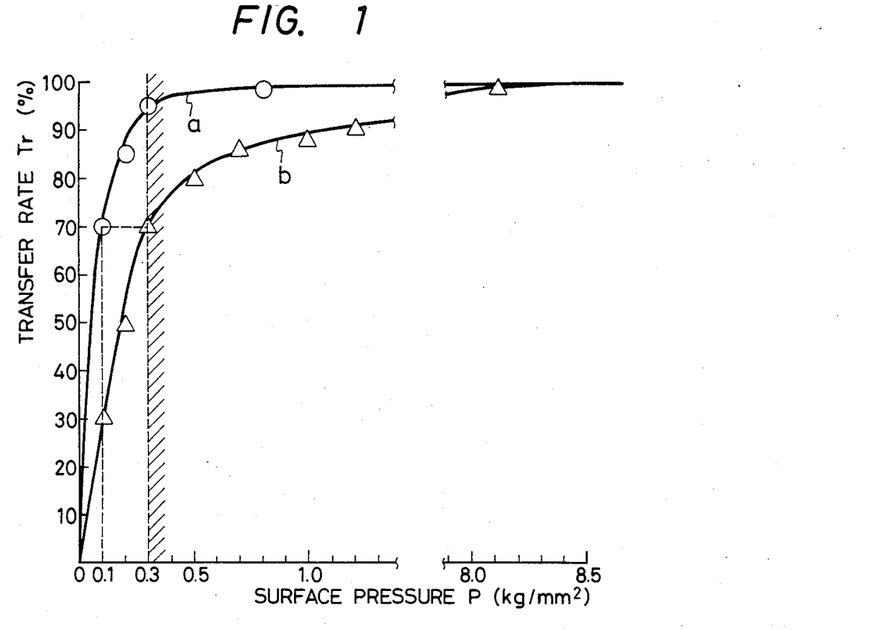
FIG. 1 is a graph showing the relation between the unit area surface pressure (P) and the transfer rate ($T_r$) of the relatively rough recording paper and the normally smooth recording paper.

According to the results of experiments made by the inventors of the present invention, the relation between the unit area surface pressure (P) from the thermal head and a transfer rate ($T_r$) varies as shown in FIG. 1. Referring to FIG. 1, the lateral axis represents the unit area surface pressure (P), and the vertical axis the transfer rate ($T_r$), the curve a and the curve b indicating the characteristics of the smooth recording paper and the characteristics of the relatively rough recording paper, respectively.

The unit area surface pressure (P) in the conventional thermal transfer printer of this kind is around 0.1 kg/mm$^2$, and the transfer rate ($T_r$) obtained by this thermal transfer printer is about 70% when the smooth recording paper is used, and about 30% when the relatively rough recording paper is used.

The construction of a platen having a flat portion for a thermal transfer printer is disclosed in Japanese Utility Model Laid-open Publication No. 157642/1983. This platen is a platen having a combination of a flat portion and a curved portion. As shown in this laid-open publication, the characteristics of this platen reside in that the plate has at least one curved surface portion and a flat surface portion continuing tangentially from the curved surface portion.

Even on the platen which has the flat surface portion the platen shown in this laid-open publication, the contacting of a glaze layer portion of the thermal head occurs if the hardness ($H_s$) of the rubber of the platen is low. With such a platen, the printing of the recording paper of the low smoothness cannot be done. Namely, merely providing the flat surface portion on the platen cannot ensure the high quality print.

SUMMARY OF THE INVENTION

An object of the present invention is to provide a printer having a thermal head wherein a high quality printed product can be obtained even when the relatively rough recording paper or the heat sensitive paper is used as the object paper.

Another object of the present invention is to provide a printer having a thermal head wherein a high quality printed product utilizing a platen having a proper rubber hardness can be obtained even when the relatively rough recording paper or the heat sensitive paper is used as the object paper.

Further object of the present invention is to provide a printer having a thermal head wherein a high quality printed product utilizing a proper head contacting condition can be obtained even when the relatively rough recording paper or the heat sensitive paper is used as the object paper.

Still object of the present invention is to provide a printer having a thermal head wherein the surface of the relatively rough recording paper can be flattened to increase the smoothness of the surface of the relatively rough recording paper.

Furthermore object of the present invention is to provide a printer having a thermal head wherein the coloring agent on the transfer film can be transferred uniformly to the relatively rough recording paper.

Stillmore object of the present invention is to provide a printer having a thermal head wherein the transfer rate can became about 70% even when the relatively rough recording paper or the heat sensitive paper is used as the object paper.

The present invention is to provide a printer having a thermal head comprising; a platen consisting of rubber; a thermal head being pressed against the platen through a recording paper or a heat sensitive paper; the thermal head being provided a head base, a glaze layer portion mounted on the head base, and a heating resistor portion provided on the glaze layer portion; and a carriage supporting the thermal head and adapted to be move in a lateral direction; characterized in that an unit area surface pressure (P) applied from the glaze layer portion of the thermal head to the recording paper or the heat sensitive paper is set to not less than 0.3 kg/mm$^2$.

The high areas of the surface of the recording paper which are opposite the heating resistor portion of the thermal head are flattened to increase the smoothness of the surface of the recording paper and thereby enable the coloring agent on the transfer film to be transferred uniformly to the recording paper in case of the thermal transfer printer.

According to the present invention, the unit area surface pressure (P) applied from the heating resistor portion of the thermal head to the recording paper or the heat sensitive paper is set to not less than 0.3 kg/mm$^2$. The unit area surface pressure (P) is defined as the pressing force (F) divided by truly contacting area between the glaze layer portion of the thermal head and the recording paper or the heat sensitive paper.

Therefore, the transfer recording operation in the thermal transfer printer is done as the glaze layer portion on the recording paper, which is opposite the heating resistor portion and is flattened to increase the smoothness of the surface of the recording paper. This enables a high quality printed product to be obtained even when the relatively rough recording paper is used as the object recording paper.

The present invention has been developed on the basis of the following concept so as to solve the previously stated various problems of the prior art. Namely, the contact unit area surface pressure (P) on only the portion, which is the peak surrounding portion or the high area portion, of the relatively rough recording paper that is necessary for carrying out a transfer recording operation is increased to the high level by utilizing the elastic deformation of the relatively rough recording paper, to momentarily depress the high area portion during the transfer recording operation of an image thereby smoothing the surface of the relatively rough recording paper.

Accordingly, it is strictly necessary that the platen be formed so as not to be deformed in as many cases as possible by the pressing force (F) from the thermal head. It has been ascertained by experiments of the inventors of the present invention that, when the platen is deformed, it becomes substantially impossible to obtain a high quality printed image on the relatively rough recording paper.

FIG. 1 is a diagram showing the relation between the unit area surface pressure (P) and the transfer rate ($T_r$) with respect to the recording paper (a) of a normal smoothness and the recording paper (b) which is relatively rough. The transfer rate ($T_r$) of the recording paper (a) of the normal smoothness is about 70% at an unit area surface pressure (P) of 0.1 kg/mm$^2$. At this transfer rate ($T_r$) with about 70%, the printing can be done substantially without trouble.

It has been discovered that, in order to obtain the transfer rate ($T_r$) of not less than 70% at the unit area surface pressure (P) of 0.1 kg/mm². At this transfer rate ($T_r$) of not less than 70% with the recording paper (b) which is relatively rough, the required unit area surface pressure (P) is not less than 0.3 kg/mm².

Figure 2:
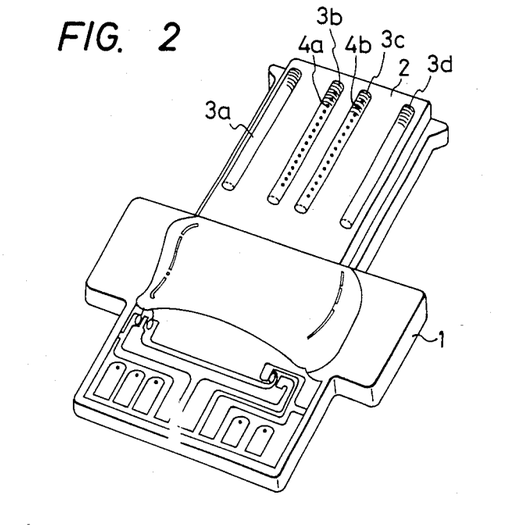
FIG. 2 is a perspective view of the thermal head.

FIG. 2 shows a perspective view of a thermal head 1. The thermal head 1 is provided on its head base 2, which is formed of an insulating material, such as a ceramic material, with four partial glaze layer portions 3a, 3b, 3c and 3d which only two heating resistor layer portions 4a and 4b are provided on the tops of the two inner glaze layer portions 3b and 3c. The glaze layer portions 3a, 3b, 3c and 3d extent at right angle to the direction in which the thermal head 1 is moved.

Figure 3:
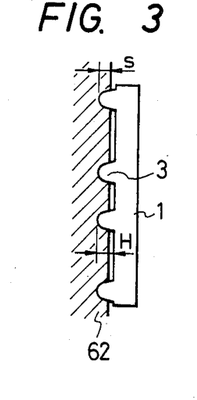
FIG. 3 is a sectional view illustrating the relation between the glaze layer portions of the thermal head and the platen having a depth of indentation.

FIG. 3 shows the head contacting between the thermal head 1, which has the height (H) of the glaze layer portions 3a, 3b, 3c and 3d, and a platen 62. The platen 62 has at a depth of indentation (Di) therein.

Figure 4:
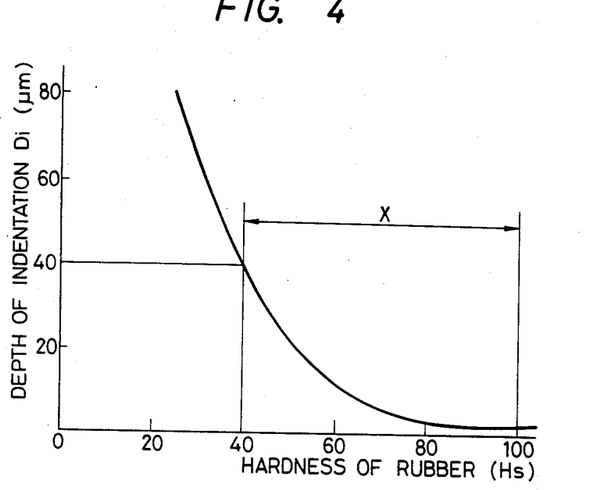
FIG. 4 is a graph showing the relation between the handness ($H_s$) of rubber of the platen and the depth ($D_i$) of indentation of the platen.

FIG. 4 shows the necessary hardness ($H_s$) of rubber of the platen 62 at a depth (s) of indentation therein of not more than the height (H) of the glaze layer portions 3a, 3b, 3c and 3d of the thermal head 1 with a necessary unit area surface pressure (P) of 0.3 kg/mm² secured.

It is understood from FIG. 4 that, in order to bring the partial glaze layer portions 3a, 3b, 3c and 3d of the thermal head 1 alone into contact with the platen 62 with no parts of the thermal head 1 contacting the platen 62, the hardness ($H_s$) of rubber of the platen 62 must be not less than $H_s 40°$.

It is necessary to provide a platen, especially a platen with a flat surface portion in advance, and maintain the hardness ($H_s$) of rubber of the platen at $H_s 40° - H_s 100°$ as shown the range (X) in FIG. 4.

In order to increase the recording paper-unit area surface pressure (P) of the heating resistor portion of the thermal head, it is also important to set the hardness ($H_s$) of the platen to a suitable level. When a platen which is not sufficiently hard is used, the pressing portion thereof is deformed inwardly by the heating resistor portion of the thermal head.

Consequently, the unit area surface pressure (P) of the portion of the thermal head which is other than the heating resistor portion thereof increases. This makes it necessary to apply the larger pressing force (F) to the thermal head for the purpose of obtaining a desired unit area surface pressure (P). Accordingly, it becomes necessary to increase the carriage driving force of the thermal transfer printer.

If a platen of an excessively high hardness ($H_s$) is used, an ineffective impact of the thermal head on the platen occurs since the surface of such an excessively hard platen will not conform to the surface of the thermal head. In order to eliminate these defects, the platen preferably consists of a rubber having a hardness ($H_s$) of about $H_s 40° - H_s 100°$.

Figure 5:
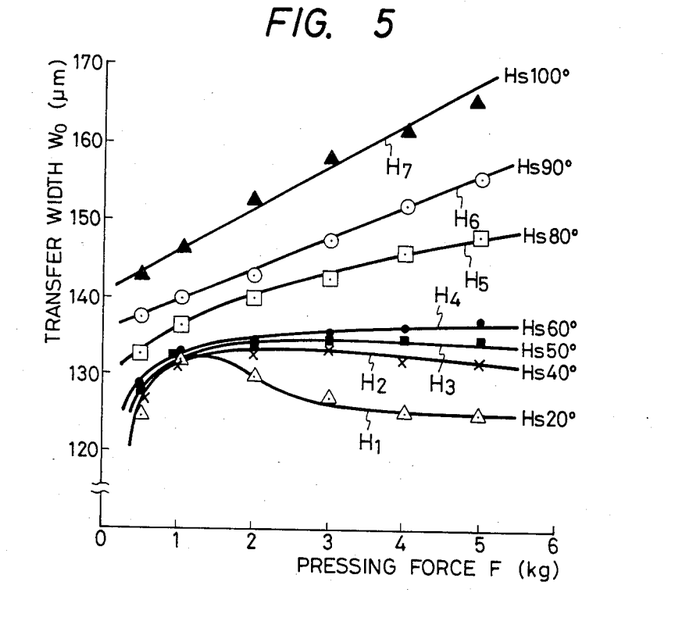
FIG. 5 is a graph showing the relation between the pressing force (F) and the transfer width ($W_o$) with respect to varius hardness ($H_s$) of rubber of the platen.

FIG. 5 is a diagram showing the relation between the pressing force (F) and the transfer width ($W_o$) with respect to various hardness ($H_s$) of rubber of a platen. Reference letter ($H_1$) denotes the rubber of a hardness ($H_s$) of $H_s 20°$, ($H_2$) the rubber of a hardness ($H_s$) of $H_s 40°$, ($H_3$) the rubber of hardness ($H_s$) of $H_s 50°$ ($H_4$) the rubber of a hardness ($H_s$) of $H_s 60°$, ($H_5$) the rubber of a hardness ($H_s$) of $H_s 80°$, ($H_6$) the rubber of a hardness ($H_s$) of $H_s 90°$, and ($H_7$) the rubber of a hardness ($H_s$) of $H_s 100°$.

Conventional platens of the thermal transfer printer mostly have a hardness ($H_s$) of rubber of not more than $H_s 20°$. These platens are not required to be applied to the relatively rough recording paper, all of them are applied to the recording paper of the normal smoothness. In these conventional platens, the hardness ($H_s$) of rubber of the platen is set low for the purpose of obtaining a sufficiently wide flat surface portion thereon.

According to FIG. 5 even if the pressing force (F) is increased to enlarge the transfer area, the rubber of the platen is deformed greatly, and the recording paper is also deformed in accordance with the deformation of the rubber of the platen. Consequently, it is evident that the unit area surface pressure (P) decreases, and that it becomes impossible to secure a necessary transfer width ($W_o$).

The hardness ($H_s$) value in the present invention is determined according to JIS (Japanese Industrial Standard) K 6301. The hardness ($H_s$) of rubber is measured by means of spring hardness test method (A type).

Figure 6:
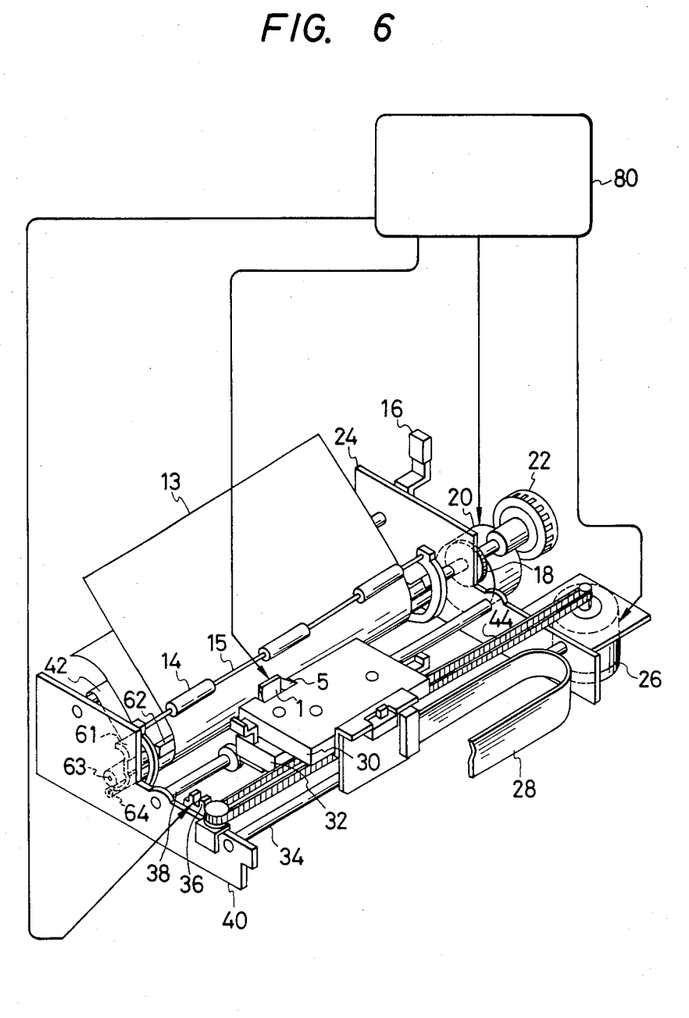
FIG. 6 is a perspective view of one embodiment of the thermal transfer printer according to the present invention.

DETAILED DESCRIPTION OF THE PREFERRED EMBODIMENTS:

One embodiment of the thermal transfer printer according to the present invention will be described with reference to FIG. 6. FIG. 6 is a perspective view of a thermal transfer printer according to the present invention.

A shaft 38 and a stay 34 are fixed between side plates 24 and 40. A carriage 32 is provided slidably on the shaft 38 and the stay 34. An ink ribbon cassette 30 and a thermal head 1 are mounted on the carriage 32, and an ink ribbon 5 or a rolled transfer film 5 is housed in the ink ribbon cassette 30. A carriage driving motor 26 is adapted to move the carriage 32 to left and right via a timing belt 44.

A line feed motor 20 is adapted to transmit the driving force to a gear 18, which is connected to the shaft of a paper feed roller 63, to feed a recording paper 13. The recording paper 13 runs between the paper feed roller 63 and a holding roller 64 and into a space between a flat platen 62 and the ink ribbon 5 via a platen support member 61. The recording paper 13 can also be fed in the same by turning a paper feed roller knob 22 by hand.

A paper guide 42 is adapted to guide the recording paper 13 being wound around the flat platen 62. The paper holding rollers 14, which are adapted to press the recording paper 13 against the flat platen 62, are mounted slidably on a shaft 15. A release lever 16 is moved forward and backward to move the shaft 15 toward and away from the shaft 15, and thereby press the recording paper 13 against the flat platen 62 or release the recording paper 13.

Reference numeral 28 denotes a flat cable for supplying a control signal and the electric power for controlling the generation of heat in the thermal head 1, and 36 a home position sensor. A control circuit 80 is adapted to receive a signal from the home position sensor 36 and control the carriage driving motor 26, the line feed motor 20 and the thermal head 1.

This thermal transfer printer is such a printer of a one-way printing system in which the printing is done only whole the carriage 32 is moved to right. Accordingly, the ink ribbon 5 is taken up only while the carriage 32 is moved to right.

The thermal head 1 will now be described more in detail as shown in FIG. 2 and FIG. 26. The heating resistor layer portion 4a is provided to cover the glaze layer portion 3b of a glass matrial on the head base 2, and an electric current is applied to a portion (A) of the heating resistor layer portion 4a by electrodes 7a and 7b to generate the heat therein. The surfaces of the heating resistor layer portion 4a and electrodes 7a and 7b are covered with a protective layer portion 8.

Accordingly, the heat from the heating resistor layer portion 4a is transmitted to the ink ribbon 5 through the protective layer portion 8. The ink ribbon 5 is formed of a base film 10, and the ink layer portion 11 of thermally meltable ink which is formed on the base film 10. The ink layer portion 11 is melted with the heat generated in the thermal head 1, to be deposited on or transferred to the recording paper 13.

In this embodiment, the hardness ($H_s$) of the flat platen 12 is adapted of about $H_s 40°-H_s 60°$. The pressing force (F) presses the thermal head 1 with about 400 g–700 g. The thermal head 1 is formed by providing two projected glaze layer portions on the central portions of the head base, and also two heating resistor layer portions on the portions of the upper surface of the glaze layer portions. The two heating resistor layer portions are disposed on the staggered forms with each other and further are projected over again with the projected glaze layer portions. The glaze layer portions extent at right angle to the direction in which the thermal head 1 is moved.

In this embodiment, the unit area surface pressure (P) applied from the thermal head 1 to the portion of the recording paper 13 which is in a region in which the thermal transfer is carried out is set to not less than 0.3 kg/mm² so as to flatten the peak or projection on the surface of the relatively recording paper 13 and increase the smoothness of the surface of the relatively rough recording paper 13. Thus, the occurrence of molten ink non-deposited portions such as the voids and the transfer failures is prevented.

The unit area surface pressure (P) from the thermal head 1 is generated by the electromagnetic force of a solenoid or the force of a spring. Accordingly, the unit area surface pressure (P) is set to the above-mentioned level by regulating the level of the electric current supplied to the solenoid or the force of the spring.

However, if the unit area surface pressure (P) is set to not less than 0.3 kg/mm² as in the embodiment of the present invention, the tranfer rate ($T_r$) becomes about 70% even with respect to the recording paper 13 which is relatively rough, so that practical printed dot 6 shown in FIG. 28 can be obtained.

Figure 7:
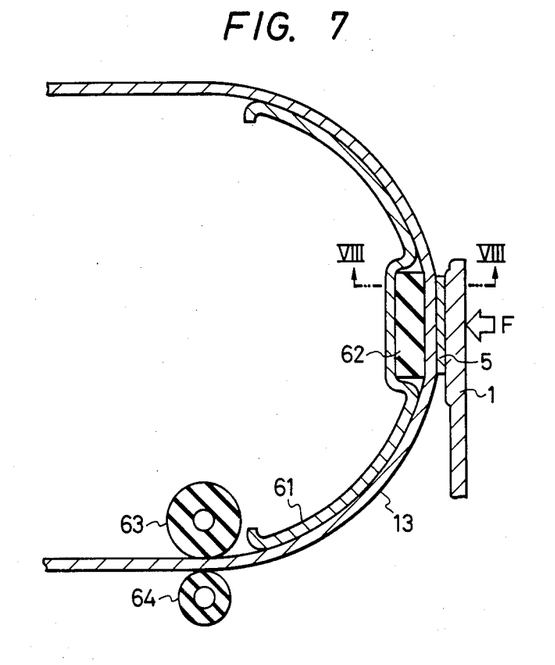
FIG. 7 is a schematic diagram showing the contacting condition of the thermal head with the flat platen in the present invention.
Figure 8:
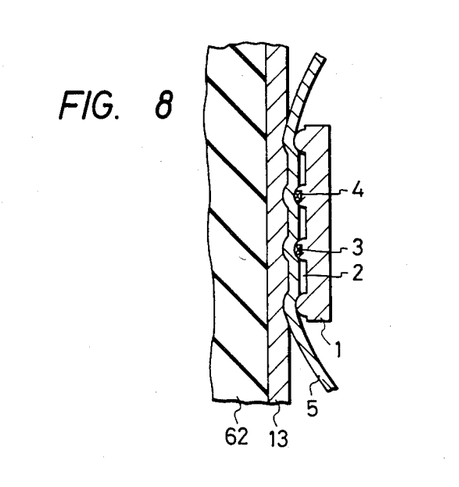
FIG. 8 is a sectional view taken a line VIII—VIII in FIG. 7.

A flat platen for the recording paper of a low smoothness according to the present invention will now be described with reference to FIGS. 7 and 8. The condition of the head contact in the thermal transfer printer according to the present invention is shown as FIGS. 7 and 8. The hardness (Hs) of rubber of the flat platen 62 according to the prsent invention is increased so that the surface of the flat platen 62 is not deformed greatly by the pressing force (F). As a result, the pressing force (F)

is transmitted to the four partial glaze layer portions 3 on the thermal head 1, and the ink ribbon 5 is pressed by the four partial glaze layer portions 3.

Thus, the contacting condition of the ink ribbon 5, the recording paper 13 and the flat platen 62 is improved, and their unit area surface pressure (P) increases, to enable the printing on the relatively rough recording paper 13. This indicates that the close contacting capability of the thermal head 1 is the most important factor among the head contact problems.

Figure 9:
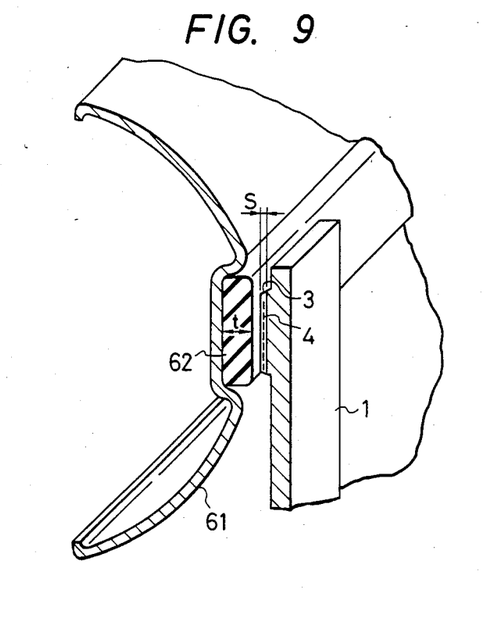
FIG. 9 is a sectional view showing the relation between the thickness (t) of the flat platen and the depth (s) of indentation made in the flat platen by the glaze layer portion.

FIG. 9 shows the pressing relation between the flat platen 62 and the partial glaze layer portion 3 provided on the thermal head 1. Especially, when the flat platen 62 is formed on the platen support member 61 by the vapor deposition with the hardness (Hs) of rubber of the platen platen 62 at not less than Hs 50°, the relation between the thickness (t) of the flat platen 62 and the depth (s) of indentaion made in the flat platen 62 by the partial glaze layer portion 3 is set to $t \geq s$.

When the apparent unit area surface pressure (P) is increased by utilizing the rigidity of the platen support member 61 with the hardness ($H_s$) of rubber of the flat platen 62 and the thickness (t) thereof set as low as less than Hs 50° and a low level, it is recommended that the thickness (t) of the flat platen 62 be set to not more than $t = 0.5$ mm.

Figure 10:
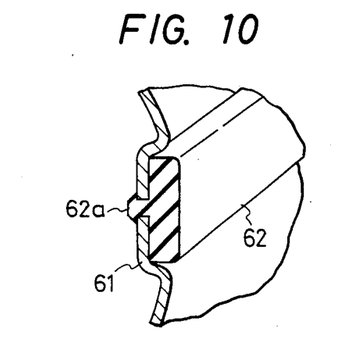
FIG. 10 is a sectioned perspective view illustrating the method of attaching the flat platen to the flat platen support members by utilizing projection part integrally formed with on the flat platen.
Figure 11:
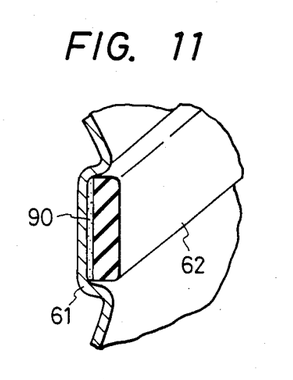
FIG. 11 is a sectioned perspective view illustrating the method of attaching the flat platen to the platen support member by utilizing the vapor deposition.

FIGS. 10 and 11 illustrate an example view of a method of attaching the flat platen 62 to the platen support member 61, respectively. FIG. 10 shows a structure in which a projection part 62a integrally formed with the flat platen 62 is pressure-fitted into a plurality of bores made in the platen support member 61.

FIG. 11 shows a structure in which the flat platen 62 is fixed to the platen support member 61 by the vapor deposition or with the bonding material. Reference numeral 90 denotes a vapor deposition layer portion or a bonded surface layer portion.

Figure 12:
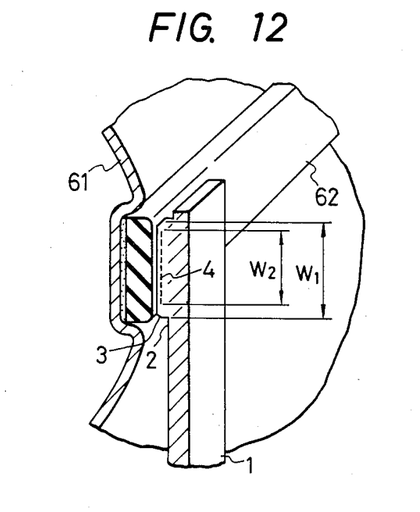
FIG. 12 is a sectioned perspective view illustrating the relation between the length ($W_1$) of the glaze layer portion of the thermal head and the length ($W_2$) of a row of dotted heating resistor portions.

FIG. 12 shows the relation between the partial glaze layer portion 3 on the thermal head 1 for obtaining a proper unit area surface pressure (P) and the heating resistor layer portion 4. In order to secure a proper unit area surface pressure (P), it is ideal that the length ($W_2$) of a row of dotted heating resistor layer portion 4 and the length ($W_1$) of the partial glaze layer portion 3 be set equal but setting the lengths ($W_2$), ($W_1$) in this manner causes a decrease in the quality of the printed product due to the widely scattered values of the dimensional accuracy.

Therefore, according to the embodiment of the present invention, these lengths are set to around 1.2 $W_2 < W_1 < 1.4\ W_2$ so as to obtain a high quality printed product. The dimensions thus set of the heating resistor layer portion 4 and the partial glaze layer portion satisfy the conditions for obtaining a high quality printed product.

As described above, in order to secure a high quality of the printed image on the relatively rough recording paper, it is most important to obtain a close contact relation between the thermal head, the ink ribbon and the relatively rough recording paper.

According to the embodiment of the present invention, the printing even on the relatively rough recording paper as an object recording paper, can be done substantially in the same manner as the printing on the normally smooth recording paper, and the high quality printed product can be obtained.

Especially, since the flat platen is used, the quantity of rubber of the flat platen in use can be reduced greatly in comparision with that in the case where a round platen is used. This enables the manufacturing cost to be also reduced greatly. Owing to the use of the flat platen, a compact thermal transfer printer can be obtained.

The embodiment of the present invention is directed to the thermal transfer printer having a construction which fully satisfies the conditions for bring the thermal head, the ink ribbon and the relatively rough recording paper into close contact with one another. This construction can also be used in a thermal printer having a heat sensitive paper.

Another embodiment of the thermal transfer printer according to the present invention will be described with reference to FIG. 13.

Figure 13:
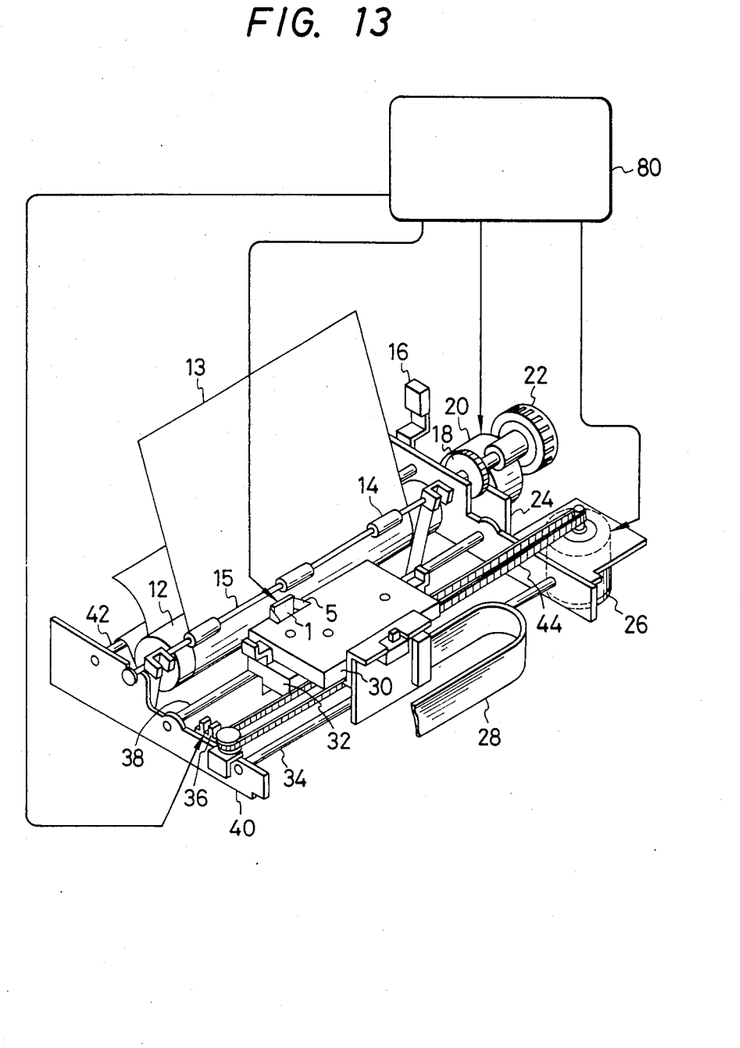
FIG. 13 is a perspective view of another embodiment of the thermal transfer printer according to the present invention.

In this embodiment as shown in FIG. 13, a round platen 12 is used as a platen. The difference between the embodiment as shown in FIG. 13 and the precedent embodiment as shown in FIG. 6 is the platen structure. Namely the round platen 12 is adapted in FIG. 13 and on the other hand the flat platen 62 is adapted in FIG. 6. The reference numerals in FIG. 13, of the same parts of the thermal transfer printer indicate the same parts shown in FIG. 6.

The round platen 12 is adapted to be turned when a gear 18 mounted on the shaft thereof is driven by a line feed motor 20, to thereby feed the recording paper 13. The round platen 12 can also be turned by manually turning a platen knob 22. A paper guide 42 is adapted to guide the recording paper 13 being wound around the round platen 12. The paper holding rollers 14, which are adapted to press the recording paper 13 against the round platen 12, are mounted slidably on a shaft 15. A release lever 16 is moved forward and backward to move the shaft 15 toward and away from the shaft 15, and thereby press the recording paper 13 against the round platen 12 or release the recording paper 13.

In this embodiment, the round platen 12 consists of rubber having a hardness (Hs) of Hs 40°–Hs 100°. According to this embodiment, the unit area surface pressure (P) applied from the heating resistor portion 4 of the thermal head 1 to the recording paper 13 is set to not less than 0.3 kg/mm². The transfer rate (Tr) with the relatively rough recording paper 13 is obtained not less than 70%.

FIGS. 14 to 25 are plan views and sectional views of modified examples of the thermal head 1, which are suitably used to obtain a preferable unit area surface pressure (P), respectively.

Figure 14:
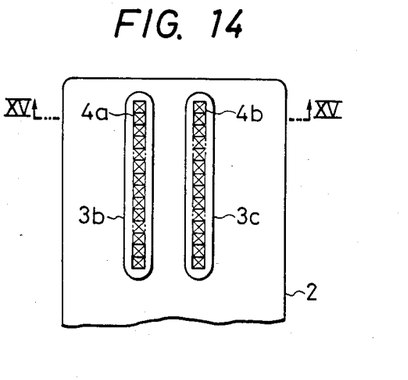
FIG. 14 is a plan view of modified example of the thermal head.
Figure 15:
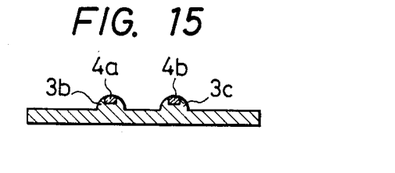
FIG. 15 is a sectional view taken along a line XV—XV in FIG. 14.

The modified example of FIGS. 14 and 15 is formed by providing two glaze layer portions 3b and 3c on the central portions of the head base 2, and also two heating resistor portions 4a and 4b on the central portions of the upper surface of the glaze layer portions 3b and 3c.

In this example, the number of glaze layer portions 3a and 3d is reduced as compared with the thermal head of shown in FIG. 2, so that the great unit area surface pressure (P) can be obtained even when the small pressing force (F) is applied to the thermal head 1. Since the glaze layer portions 3b and 3c are formed semicylindrically, the ink ribbon 5 is not broken by the edge of the head base 2.

Figure 16:
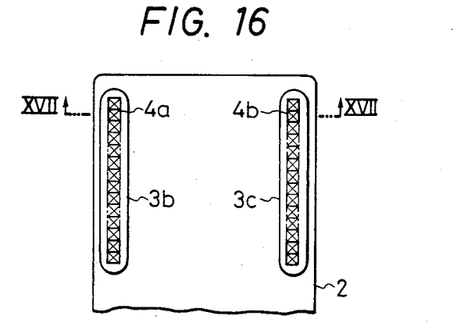
FIG. 16 is a plan view of modified example of the thermal head.
Figure 17:
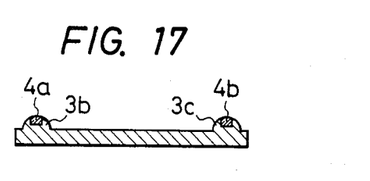
FIG. 17 is a sectional view taken along a line XVII—XVII in FIG. 16.

The modified example of FIGS. 16 and 17 is formed by providing two glaze layer portions 3b and 3c on both end portions of the head base 2, and two heating resistor portions 4a and 4b on the central portions of the upper surfaces of the glaze layer portions 3b and 3c. This enables the unit area surface pressure (P) at the heating resistor portions 4a and 4b to be increased, and the breakage of the ink ribbon 5 to be prevented.

Figure 18:
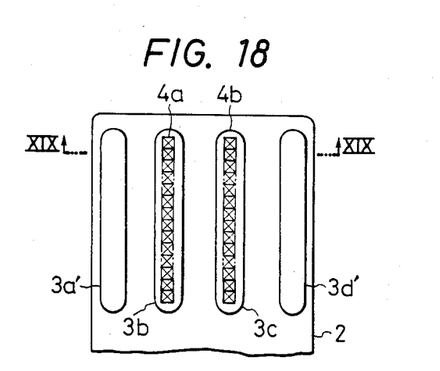
FIG. 18 is a plan view of modified example of the thermal head.
Figure 19:
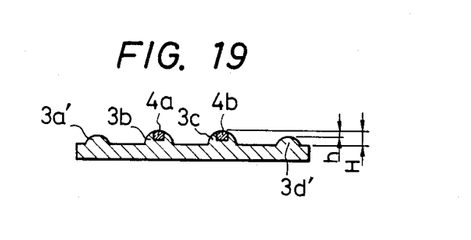
FIG. 19 is a sectional view taken along a line XIX—XIX in FIG. 18.

The modified example of FIGS. 18 and 19 is formed by providing two dummy glaze layer portions 3a' and 3d', of a height (h) smaller than a height (H) of the other two glaze layer portions 3b and 3c. This enables the unit area surface pressure (P) at two heating resistor portions 4a and 4b to be increased, and the breakaage of the ink ribbon 5 to be prevented.

Figure 20:
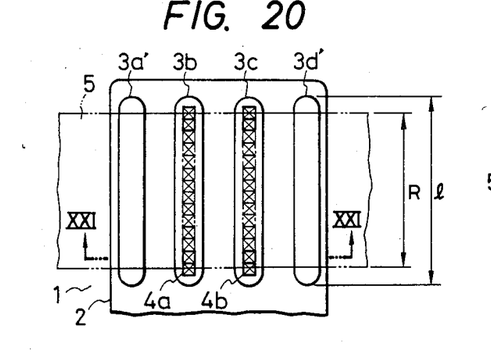
FIG. 20 is a plan view of modified example of the thermal head.
Figure 21:
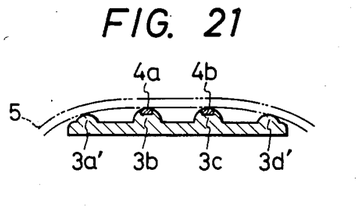
FIG. 21 is a section view taken along a line XXI—XXI in FIG. 20.

The modified example of FIGS. 20 and 21 is formed by setting the length (l) of four glaze layer portions 3a', 3b, 3c and 3d' larger than the width (R) of the ink ribbon 5 so as to prevent the ink ribbon 5 from being hurt by the edges at both end portions of two glaze layer portions 3a' and 3d', and also a printed product prevent from being stained with the coloring agent from the ink ribbon 5.

Figure 22:
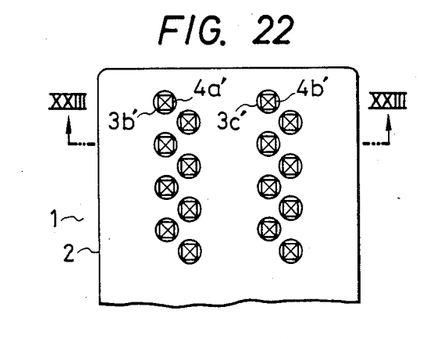
FIG. 22 is a plan view of modified example of the thermal head.
Figure 23:
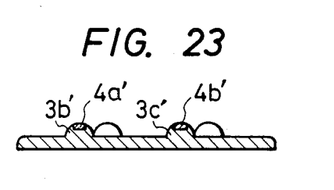
FIG. 23 is a sectional view taken along a line XXIII—XXIII in FIG. 22.

The modified example of FIGS. 22 and 23 is formed by providing with two independent glaze layer portiosn 3b' and 3c' and two heating resistor portions 4a' and 4b' for different picture elements on the base head 2.

Figure 24:
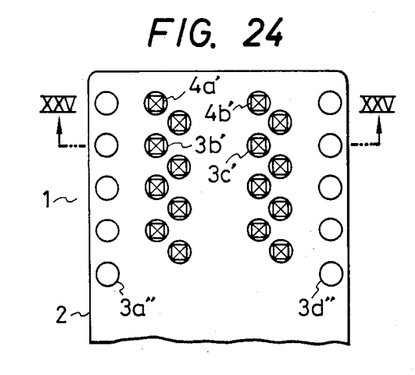
FIG. 24 is a plan view of modified example of the thermal head.
Figure 25:
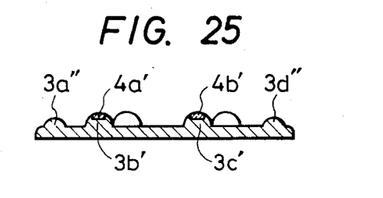
FIG. 25 is a sectional view taken along a line XXV—XXV in FIG. 24.

The modified example of FIGS. 24 and 25 is formed by further providing with two independent dummy glaze layer portions 3a'' and 3d'' on both end portions of the head base 2 in addition to the example shown as FIGS. 22 and 23.

What is claimed is:

1. A printer having a thermal head comprising: a rubber platen; a thermal head adapted to be pressed against said platen through one of a recording paper and a heat sensitive paper, said receiving paper and said heat sensitive paper having a relatively rough texture; said thermal head being provided with a head base; a glaze layer portion mounted on said head base, and a heating resistor portion provided on the glaze layer portion; and a carriage supporting said thermal head and adapted to be moved in a lateral direction; a unit area surface pressure appplied from the glaze layer portion of said thermal head to said recording paper where said heat sensitive paper is set to be not less than 0.3 kg/mm$^2$, the glaze layer portion of said thermal head extends at right angles to a direction in which said thermal head is moved, and a hardness of the rubber of said platen is about Hs 400°-Hs 100°.

2. A printer having a thermal head according to claim 1, wherein said platen has a flat platen surface.

3. A thermal transfer printer comprising: a rubber platen, a thermal head adapted to be pressed against said platen through a recording paper having a relatively rough texture; said thermal head being provided with a head base, a glaze layer portion mounted on the head base, and a heating resistor portion provided on the glazed layer portion; an ink ribbon cassette containing a rolled transfer film therein; and a carriage supporting said ink ribbon cassette and said thermal head and adapted to be moved in a lateral direction; a unit area surface pressure applied from the glazed layer portion of said thermal head to said recording paper set to be not less than 0.3 kg/mm$^2$, the glaze layer portion of said thermal head extends at a right angle to a direction in which said thermal head is moved, and a hardness of the rubbber of said platen is about Hs 40°-Hs 100°.

4. A thermal transfer printer according to claim 3, wherein said platen has a flat platen surface.

5. A thermal transfer printer according to claim 4, wherein a relationship betwen a thicknesss of said flat platen and a depth of an indentation made in said flat platen by the glaze layer portion of said thermal head is set to be $t < s$.

6. A thermal transfer printer according to claim 4 wherein a thickness of said flat platen is not greater than 0.5 mm.

7. A thermal transfer printer according to claim 4, wherein a ratio between a length ($W_1$) of the glaze layer portion of said thermal head and a length ($W_2$) of the heating resistor portion is determined in accordance with the following relationship:

$$W_1/W_2 = 1.2 - 1.4.$$

8. A thermal printer comprising a rubber platen; a thermal head adapted to be pressed against said platen thrrough a heat sensitive paper having a relatively rough texture; said thermal head being provided with a head base, a glaze layer portion mounted on the head base, and a heating resistor portion provided on the glaze layer portion; a carriage supporting said thermal head and adapted to be moved in a lateral direction; a unit area surface pressure applied from the glaze layer portion of said thermal head to said recording paper is not less than 0.3 kg/mm$^2$, the glaze layer portion of said thermal head extends substantially at a right angle to a direction in which said thermal head is moved, and a hardness of the rubber of said platen is about Hs 40°-Hs 100°.

9. A thermal printer according to claim 8, wherein said rubber platen has a flat platen surface.

* * * * *